United States Patent [19]
Hujer et al.

[11] 3,963,344
[45] June 15, 1976

[54] PHOTOGRAPHIC PRINTING APPARATUS WITH REDUCED NUMBER OF INPUT MEANS FOR ENTERING CORRECTION VALUES

[75] Inventors: Friedrich Hujer, Grunwald; Volker Weinert, Munich; Harald Fengler, Taufkirchen, all of Germany

[73] Assignee: AGFA-Gevaert, A.G., Leverkusen, Germany

[22] Filed: Oct. 17, 1974

[21] Appl. No.: 515,630

[30] Foreign Application Priority Data
Oct. 20, 1973 Germany............................ 2352765

[52] U.S. Cl. ................................... 355/35; 355/67; 355/83
[51] Int. Cl.² .......................................... G03B 27/76
[58] Field of Search ....................... 355/32, 35–38, 355/64, 67–70, 83

[56] References Cited
UNITED STATES PATENTS
3,829,214   8/1974   Zahn et al. ......................... 355/38 X

*Primary Examiner*—Richard A. Wintercorn
*Attorney, Agent, or Firm*—Michael J. Striker

[57] ABSTRACT

Each correction factor can assume one of a plurality of values and the selected value is to be stored in the printing apparatus. A plurality of input keys is provided, each furnishing a selected value upon activation. Activation of the key applies the input signal signifying the chosen value to the storage inputs of a plurality of storages, one for each correction factor. Further, activation of each key advances a counter by one step. The counter output enables each of the storages in turn.

17 Claims, 1 Drawing Figure

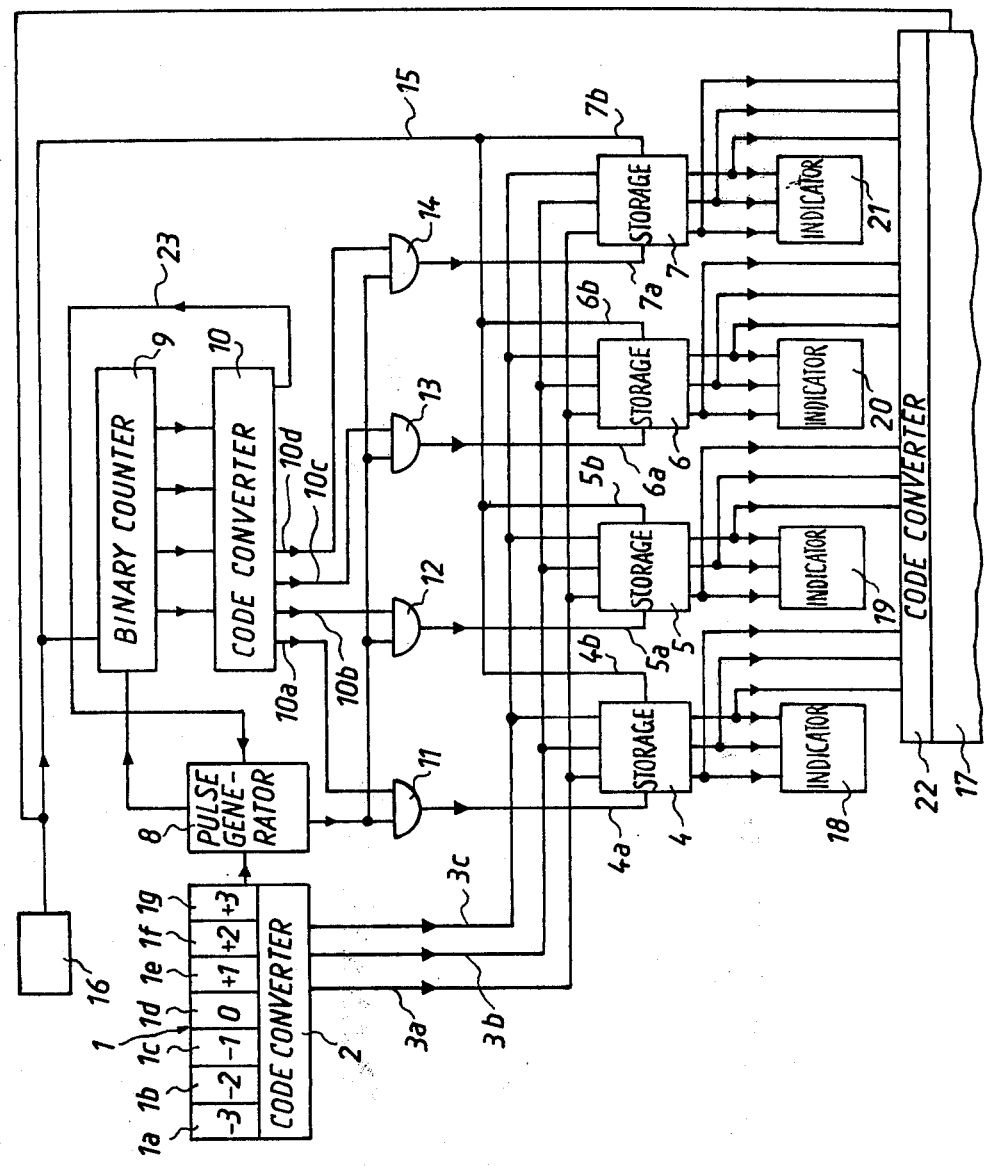

PHOTOGRAPHIC PRINTING APPARATUS WITH REDUCED NUMBER OF INPUT MEANS FOR ENTERING CORRECTION VALUES

BACKGROUND OF THE INVENTION

The present invention regards the equipment for entering a determined number of correction factors into photographic printing apparatus. Each of the correction factors may assume one of a predetermined number of values.

In photographic printing apparatus, it is necessary to enter values of a number of correction factors such as the density correction factor which may assume any one of the values of −3, −2, −1, 0, +1, +2 or +3, each of these steps of values indicating a change of approximately 35 percent. Similarly correction factors requiring the selection of one of a plurality of values for color correction in the colors blue, green and red are required. In conventional apparatus, a key is provided signifying each correction factor and further an individual key is required for each value of each of these correction factors. In this way the operator may make a visual inspection of the negative and enter correction values corresponding to the particular characteristics of this negative into the apparatus. When the values of all of the correction factors have been entered, a key is depressed which causes the printing process to take place with the so-entered values of the various correction factors.

This type of input arrangement has a number of disadvantages. First of all a great number of input keys is required. For example, for four correction factors each being able to assume seven different values, 28 keys are required. This tends to make the equipment somewhat unwieldy and unreliable. Further, the operator must find the correct keys out of a relatively large key field which requires visual concentration.

SUMMARY OF THE INVENTION

It is an object of the present invention to decrease the number of input keys required for printing apparatus of the above-described type.

The present invention is equipment for entering a selected one of a plurality of values for each of a determined number of correction factors into photographic printing apparatus. It comprises a plurality of input means corresponding in number to said plurality of values, each for furnishing an input signal corresponding to a selected one of said values upon external activation. A plurality of storage means are provided, one for storing each of said correction factors, each having a storage input connected to said input means and an enabling input. Further comprised are gating means for furnishing enabling signals to each of said enabling inputs in turn in a predetermined sequence in response to activation of said input means, whereby the selected values of each of said correction factors is entered in turn into each of said storage means.

This type of arrangement has the advantage that the operator utilizes only a single set of keys and that the gating means which in a preferred embodiment of the present invention are a binary counter, automatically enter the selected value of the correction factor into the storage associated with said correction factor. The cost of the equipment is also greatly decreased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE is a schematic diagram of the equipment of the present invention.

DESCRIPTION OF THE PREFERRED EMBODIMENTS

A preferred embodiment of the present invention will now be described with reference to the drawing.

A key field having keys $1a-1g$ is denoted by reference numeral 1. The marking on the keys is −3, −2, −1, 0, +1, +2 and +3 respectively. These designations are the designations conventionally used in printing equipment for the different values of the correction factors. The seven keys have electrical outputs connected to the inputs of a code converter 2 which converts each of the signals into a binary coded signal available at the code converter output lines $3a$, $3b$ and $3c$. These lines are connected to the storage inputs of all of the storage means, namely storages 4, 5, 6 and 7. Each of the storages is to store the selected value of a corresponding correction factor. The signals at the output of the code converter are thus continually applied to the storage inputs of all of the storages. Each of the storages may in well-known fashion be constructed of semi-conductor elements such as flip-flops. The storages are also commercially available as individual storage units.

Further, a pulse generator 8 has an input connected to the key field (input means). Every activation of a key causes a pulse to be furnished at the output of pulse generator 8. The pulse may be generated either in response to the pressing of the key or in response to the release of the key. The output of pulse generator 8 is connected to the input of gating means, here a binary counter 9. The gating means could of course alternatively be embodied in a shift register, in a mechanical step switch, or various other means. Directly connected to the counter is a code converter 10 which causes the signals at the output of counter 9 to be converted to decimal signals, that is the output lines of the code converter namely lines $10a-10d$ are energized in turn and in response to each counting output signal furnished by binary counter 9. Lines $10a-10d$ are respectively applied to the first inputs of AND-gates 11–14. The second input of AND-gates 11–14 is connected in common to a second output of pulse generator 8. The pulse output furnished to gates 11–14 precedes the output furnished to binary counter 9 by some small amount. For example, the pulse advancing binary counter 9 may be derived from the trailing edge of the pulse applied to AND-gates 11–14.

The outputs of AND-gates 11–14 are each connected to an enabling input of a corresponding one of storages 4–7. A signal applied to the enabling input of these storages causes the content of these storages to be changed in accordance with the signal at the storage input. The enabling inputs are denoted by reference numerals $4a-7a$, respectively. Each of the storages has a further input namely inputs $4b-7b$ which are connected through a common line 15 to means for furnishing a reset signal. This means may for example be a manually activatable key 16 or alternatively, the reset signal may be derived from the exposure control circuit (17) at the end of the printing process. Counter 9 is also reset to zero by the signal on line 15.

The signals furnished by the depression of the keys for each of the correction factors are stored in storages 4–7 in coded form. An indicator is connected to the output of each of the storages (18–21) for indicating the value stored therein. The indicators each contain a decoding network so that the visual indication is furnished in exact correspondence to the indication on the input keys. Further, the storage outputs of each of the storages is connected through a decoder 22 to the actual printing control circuit 17. The latter may be constructed in accordance with the embodiment shown in German patent No. 2,246,466 corresponding to U.S. patent application Ser. No. 399,184. Various color correction potentiometers (43, 65 and 66) are shown in this patent. For purposes of the present invention these are replaced by six resistors which are selectively connectable into the circuit in accordance with the values stored in storages 4–7.

The above-described equipment operates as follows: Originally, counter 9 is reset to zero and storages 4–7 are also in a reset state. No indication is shown on indicators 18–21. A negative is now examined and it is determined that a density correction of +2 is required for this negative. The +2 key is pressed. This causes the binary coded representation of +2 to be applied to the storage input of storages 4–7 by means of lines 3a–3c. Since however counter 4 is reset to zero, only AND-gate 11 has an energized second input. Thus the pulse which has been generated at the first output of pulse generator 8 in response to the pressing of the +2 key causes a signal to appear at the output of AND-gate 11 and thereby at the enabling input 4a of storage 4. Thus the +2 value is stored in storage 4 causing indicator 18 to indicate a +2 value. At the end of the pulse furnished by pulse generator 8 to AND-gate 11, a pulse is furnished to binary counter 9 advancing this counter by one count. AND-gate 12 now has a second input which is energized.

It is now determined that the next selected value, namely the value for the correction factor for the color correction in the color blue is zero, the 0 key is pressed. The coded 0 value of course appears on lines 3a–3c and, as previously stated, is applied to all storage inputs of storages 4–7. However, an enabling signal exists at enabling input 5a only since only, AND-gate 12 has an energized second input. This causes the 0 value to be stored in storage 5 and a corresponding indication to appear on indicator 19. Again, binary counter 9 is advanced by one count causing the second input of AND-gate 13 to be energized. The process is thus continued until the selected values for the correction factors for storages 6 and 7 are also entered. The capacity of binary counter 4 is thus exhausted. This causes a blocking signal to be applied through line 23 to a blocking input of pulse generator 8 so that no further signal may be entered into any of the storages since none of the AND-gates 11–14 can be energized by pulse generator 8.

At this point in time the correct values for each correction factor have been entered into storages 4–7. All indicators 18–21 are lit and indicate the so-entered correcton value. The printing process can now be started either by pressing a separate key or, alternatively, the pressing of the key for the last correction value is used to initiate the printing process. The printing or exposure control circuit 17 which has been adjusted to the correct values of the various correction factors through the decoder 22 then operates. At the end of the printing process or at the end of the exposure, a signal is furnished which resets counter 9 and storages 4–7 so that new correction values can be entered for the next negative.

If the operator has made an error while entering the correction values and wishes to change this value, key 16 must be depressed causing all correction values to be reset and enabling the operator to enter new values. The pushing of reset key 16 also causes the blocking signal for pulse generator 8 to be eliminated.

Other constructions of counter 4 are possible. For example, entering of the first correction factor can cause the printing process for the particular negative to commence. Alternatively, an additional key can be provided which allows the printing process to proceed when, during a full counter, only one or two correction values are to be entered at the beginning of the sequence but no further correction values with then be required.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Photographic printing apparatus for making a print from an original, said printing apparatus having compensating circuits responsive to a plurality of stored correction signals each representing a selected one of a predetermined plurality of values for one of a determined number of correction factors required for compensating for deviations of a corresponding photographic characteristic of said negative from a desired value of said characteristic, the improvement, comprising, in combination, a plurality of input means corresponding in number to said plurality of values but independent of the number of said correction factors, each for furnishing an input signal corresponding to a selected one of said values upon external activation; a plurality of storage means, each having a storage input connected to all of said input means and an enabling input, for storing the signal applied to said storage input only in the presence of a signal at said enabling input; and gating means connected to said input means and said enabling inputs of said storage means, for enabling said storage means in a predetermined sequence, one in response to each activation of said input means, whereby activation of said input means to furnish the selected value of each of said correction factors in a sequence corresponding to said predetermined sequence causes the so-selected values to be entered in turn into the corresponding one of said storage means, the so-stored values constituting said stored correction signals.

2. Apparatus as set forth in claim 1, further comprising coding means connected to the output of said input means for coding each of said input signals in accordance with a predetermined code.

3. Equipment as set forth in claim 2, wherein said predetermined code is a binary-coded decimal code.

4. Equipment as set forth in claim 2, further comprising decoding means connected to the output of said storage means for decoding said stored signals thereby furnishing decoded stored signals.

5. Equipment as set forth in claim 1, wherein said gating means comprise pulse generator means connected to the output of said input means for furnishing a pulse in response to each activation of said input means, a binary counter connected to said pulse generator means for counting said pulses and furnishing a counting output signal corresponding to the number of so-counted pulses, and logic circuit means connected to said binary counter and said enabling inputs of said storage means for furnishing said enabling signals at least in part under control of said counting output signals.

6. Equipment as set forth in claim 5, wherein said logic circuit means comprises code converter means having a plurality of converter inputs connected to said binary counter and having a plurality of converter outputs, for energizing each of said converter outputs in response to a corresponding one of said counting output signals, and means for connecting said converter outputs to said enabling inputs of said storage means.

7. Equipment as set forth in claim 6, wherein said means for connecting said converter outputs to said enabling inputs comprise a plurality of AND-gates each having an output connected to a corresponding one of said enabling inputs, each having a first input connected to said pulse generator means and a second input connected to a corresponding one of said converter outputs.

8. Equipment as set forth in claim 7, wherein said code converter further has an additional output connected to said pulse generator means for blocking said pulse generator means in response to a counting output signal corresponding to the last of the so-enabled storage means in said predetermined sequence.

9. Apparatus as set forth in claim 1, further comprising reset means for resetting said gating means and said storage means.

10. Equipment as set forth in claim 9, wherein said reset means comprise a manually operable key.

11. Apparatus as set forth in claim 1, further comprising a plurality of indicator means each connected to one of said storage means, each for indicating the value stored therein.

12. Apparatus as set forth in claim 1, wherein said photographic printing apparatus includes exposure control means furnishing a terminating signal at the end of the exposure time; further comprising means for interconnecting said exposure control circuit, said storage means and said gating means in such a manner that said storage means and said gating means are reset in response to said terminating signal.

13. Apparatus for entering a selected one of a plurality of values for each of a determined number of correction factors into photographic printing apparatus, comprising, in combination, a plurality of input means corresponding in number to said plurality of values, each for furnishing an input signal corresponding to a selected one of said values upon external activation; a plurality of storage means each for storing one of said correction factors, each having a storage input connected to said input means and an enabling input; and gating means connected to said input means and said enabling inputs of said storage means, for enabling said storage means in a predetermined sequence in response to activation of said input means, said gating means comprising pulse generator means connected to the output of said input means for furnishing a pulse in response to each activation of said input means, a binary counter connected to said pulse generator means for counting said pulses and furnishing a counting output signal corresponding to the number of so-counted pulses, and logic circuit means connected to said binary counter and said enabling inputs of said storage means for furnishing said enabling signals at least in part under control of said counting output signals, whereby the selected value of each of said correction factors is entered in turn into each of said storage means.

14. Apparatus as set forth in claim 13, wherein said logic circuit means comprise code converter means having a plurality of converter inputs connected to said binary counter and having a plurality of converter outputs, for energizing each of said converter outputs in response to a corresponding one of said counting output signals, and means for connecting said converter outputs to said enabling inputs of said storage means.

15. Apparatus as set forth in claim 14, wherein said means for connecting said converter outputs to said enabling inputs comprise a plurality of AND-gates each having an output connected to a corresponding one of said enabling inputs, each having a first input connected to said pulse generator means and a second input connected to a corresponding one of said converter outputs.

16. Apparatus as set forth in claim 15, wherein said code converter further has an additional output connected to said pulse generator means for blocking said pulse generator means in response to a counting output signal corresponding to the last of the so-enabled storage means in said predetermined sequence.

17. Apparatus for entering a selected one of a plurality of values for each of a predetermined number of correction factors into photographic printing apparatus including exposure control means furnishing a terminating signal at the end of the exposure time, comprising, in combination, a plurality of input means corresponding in number to said plurality of values, each for furnishing an input signal corresponding to a selected one of said values upon external activation; a plurality of storage means each for storing one of said correction factors, each having a storage input connected to said input means and an enabling input; and gating means connected to said input means and said enabling inputs of said storage means, for enabling said storage means in a predetermined sequence in response to activation of said input means; further comprising means for interconnecting said exposure control circuit, said storage means and said gating means in such a manner that said storage means and said gating means are reset in response to said terminating signal.

* * * * *